(12) United States Patent
Merchant

(10) Patent No.: US 7,032,086 B2
(45) Date of Patent: Apr. 18, 2006

(54) SYSTEM AND METHOD FOR ADJUSTING STORAGE DEVICE LAYOUT WITH AT LEAST ONE STATUS FOR THE ADJUSTING

(75) Inventor: Arif Merchant, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 328 days.

(21) Appl. No.: 10/375,177

(22) Filed: Feb. 28, 2003

(65) Prior Publication Data

US 2004/0172503 A1    Sep. 2, 2004

(51) Int. Cl.
*G06F 13/00*    (2006.01)

(52) U.S. Cl. ............... 711/156; 711/163; 711/171; 711/114

(58) Field of Classification Search ............ 711/114, 711/112, 163, 156, 170–173; 714/6
See application file for complete search history.

(56) References Cited

U.S. PATENT DOCUMENTS

| | | | | | |
|---|---|---|---|---|---|
| 5,077,736 | A | * | 12/1991 | Dunphy et al. | 714/7 |
| 5,237,658 | A | * | 8/1993 | Walker et al. | 710/38 |
| 5,390,327 | A | * | 2/1995 | Lubbers et al. | 714/7 |
| 5,392,244 | A | * | 2/1995 | Jacobson et al. | 711/114 |
| 5,428,758 | A | * | 6/1995 | Salsburg | 711/165 |
| 5,524,204 | A | * | 6/1996 | Verdoorn, Jr. | 714/6 |
| 5,584,008 | A | * | 12/1996 | Shimada et al. | 711/114 |
| 5,657,468 | A | * | 8/1997 | Stallmo et al. | 711/114 |
| 5,737,745 | A | * | 4/1998 | Matsumoto et al. | 711/114 |
| 5,758,118 | A | * | 5/1998 | Choy et al. | 711/114 |
| 5,875,456 | A | * | 2/1999 | Stallmo et al. | 711/114 |
| 6,000,010 | A | * | 12/1999 | Legg | 714/7 |
| 2001/0047448 | A1 | * | 11/2001 | Sueoka et al. | 711/4 |
| 2002/0087751 | A1 | * | 7/2002 | Chong | 710/33 |

* cited by examiner

*Primary Examiner*—Matthew Kim
*Assistant Examiner*—Hetul Patel

(57) ABSTRACT

An adjustable storage system modifies a layout of a storage device having a plurality data blocks during a transfer process. The storage system may include an array controller connected to the storage device, and an index table connected to the array controller for storing addresses of data blocks from the magnetic storage device. The addresses of stored data blocks represent the data blocks involved in the transfer process.

29 Claims, 7 Drawing Sheets

SYSTEM AND METHOD FOR ADJUSTING STORAGE DEVICE LAYOUT WITH AT LEAST ONE STATUS FOR THE ADJUSTING

FIELD OF THE INVENTION

This invention relates generally to computer storage systems. More particularly, this invention relates to an adjustable computer storage system.

BACKGROUND OF THE INVENTION

Redundant Arrays of Independent Disks (RAID) array includes an array of disks, which are viewed by a host, such as a computer system, as a single disk. A RAID array is a scheme for storing the same data in different places (thus, redundantly) on multiple hard disks. By placing data on multiple disks, input/output (I/O) operations can overlap in a balanced way, therefore, improving performance. Since multiple disks increase the mean time between failure (MTBF), storing data redundantly also increases fault-tolerance.

A RAID storage system typically includes a controller and an array of disks. A controller may be hardware or software tool for providing an interface between the host and the array. The controller manages the array of disks for storage and retrieval and can view the disks of the RAID separately. The controller may be configured to access the array of disks as defined by a particular "RAID level."

The RAID level specifies how the data is distributed across the disk drives and how error correction is accomplished. There are numerous RAID level architectures.

As RAID level architectures become more commonplace, users may desire to convert from one RAID level architecture to another or adjust the number of disk arrays within an existing architecture. There could be many reasons for performing such an operation, such as for performance, or change in capacity.

However, adjusting the disk array or changing RAID levels may be difficult after the array is operational and contains useful data. In known arrangements, the user is denied access to all the data on the array, the RAID array is then taken off-line, and the data thereon is reconfigured to a back-up medium. The array is then reconfigured in a desired format, and the data from the back-up medium is written back onto the array. For example, U.S. Pat. No. 5,524,204 describes a method for dynamically expand a RAID-5 system. This method is limited only to the expansion of an RAID-5 system and does not discussion contraction or its application to other types of RAID systems.

SUMMARY OF THE INVENTION

According to an embodiment of the invention, the invention is an adjustable storage system for modifying a layout of a storage device having a plurality of data blocks, during a transfer process, includes an array controller connected to the storage device. The system also includes an index table connected to the array controller for storing addresses representing data blocks in the storage device, such that the addresses of the stored data blocks represent the data blocks involved in the transfer process.

According to another embodiment of the invention, the invention is a method for reconfiguring a portion of a storage device. The method comprising the following steps: selecting a plurality of data blocks in the storage device; changing a status of a data block stored in an index table, which stores addresses of the plurality of selected data blocks; granting access to the plurality of selected data blocks based on information in the storage device; and reconfiguring the plurality of selected data blocks to a desired layout.

According to yet another embodiment of the invention, a method for converting from an existing layout of a storage device to at least a new layout of the storage device without reducing access to the storage device includes storing the addresses of the plurality of selected data blocks in a storage device, such that the storage device maintains the memory addresses of the plurality of data blocks which are in the process of being transferred, and the data blocks that have already been transferred. Selected data blocks, which are in the process of being reconfigured, are stored, and then processed after the selected data blocks have been reconfigured into a desired format.

DETAILED DESCRIPTION OF A PREFERRED EMBODIMENT

In the following detailed description, numerous specific details are set forth in order to provide a thorough understanding of the present invention. However, it will be apparent to one of ordinary skill in the art that these specific details need not be used to practice the present invention. In other instances, well known structures, interfaces, and processes have not been shown in detail in order not to unnecessarily obscure the present invention.

The present invention allows for the reconfiguring of a RAID (magnetic) disk array without limiting access to the contents of the array. An index table stores memory addresses of the data blocks that have been reconfigured or have yet to be reconfigured. The host processor uses this information to determine whether requests to read or write to selected data blocks can be executed or stored in a cache memory until the reconfiguring process is complete. This invention adds a method that allows the controller to change the configuration of a logical unit of storage devices without restricting access to the data during the reconfiguration.

The method makes use of an index table. The index table is a software artifact which keeps track of which blocks the data are stored in the old layout, which ones are in transition, and which ones have been moved to the new layout. It may or may not also keep track of the actual location of these blocks on the disks. Of course, a variety of other implementations are possible, including saving the table on disk or even a hardware implementation. The physical location(s) on disk of any data block can be computed from the layout using well-known formulas.

Figure 1:
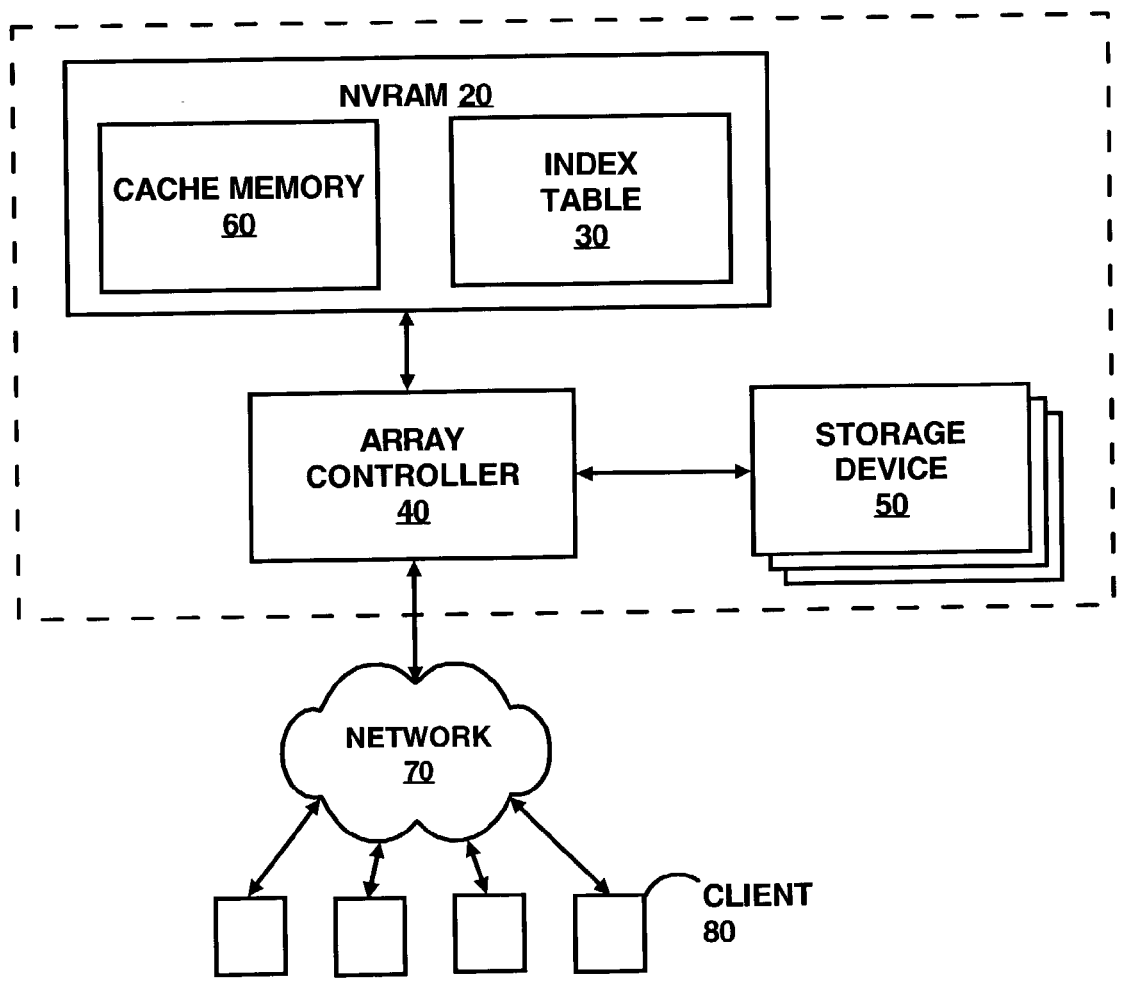
FIG. 1 illustrates a system, according to an embodiment of the invention.

FIG. 1 illustrates a system 10, according to an embodiment of the invention. The system 10 includes a non-volatile random access memory (NVRAM) 20, array controller 40, and storage device 50. The array controller 40 is connected to at least one client 80 (e.g., servers) via a network 70.

The NVRAM 20 includes an index table 30 and a cache memory 60. The index table 30 is a software artifact which keeps track of which blocks of the data which on the storage device 50 in an existing layout, which ones are in transition, and which ones have been moved to a new layout. It may or may not also keep track of the actual location of these blocks on the disks. The index table 30 stores the data blocks' memory addresses, representing the location of the data blocks involved with a reconfiguration process (i.e., whether the layout has been reconfigured or is in the process of being reconfigured). The location of the data memory block is computed using a known mathematical algorithm. The index table 30 may store the location data in hash table, saving the table on disk, a hardware implementation or other similar type of non-volatile memory. One of ordinary skill can also recognize that the index table 30 may consist of more than one table. For example, the index table 30 could consist of three tables, each storing memory addresses in accordance with their status.

The cache memory 60 is connected to the array controller 40. The cache memory 60 stores requests for memory access when the layout of the storage device 50 is being altered. The cache 60 is of a kind known in the art.

The array controller 40 is a logical entity, which manages the layout (i.e., the RAID format) and provides access to the storage device 50. The array controller 40 determines the location of the desired stored data, and operates with the storage device 50 to retrieve (in the case of read request) the data. As the layout of the storage device 50 changes, the array controller 40 manages the memory layout and controls read and write requests.

The storage device 50 may include a plurality of direct access storage devices or disk drives, controlled by the array controller 40. Preferably, the storage device 50 is a redundant array of independent disks. The storage device 50 may exist in numerous layouts (RAID Level 0, RAID Level 1, RAID Level 2, RAID Level 3, RAID Level 4, RAID Level 5, etc).

In one embodiment, the storage device 50 may be configured to operate with fast storage devices (not shown). The fast storage devices would store redundant data (e.g., mirror data or parity information), while the storage device 50 would store a copy of the data.

The array controller 40, NVRAM 20 and storage devices 50 may be connected to one or more clients 80 via a network 70. The clients 80 may be separate workstations or computers that may request access to data stored on the storage device 50. The client 80 and the network 70 may be of kinds known to one of ordinary skill in the art.

Figure 2:
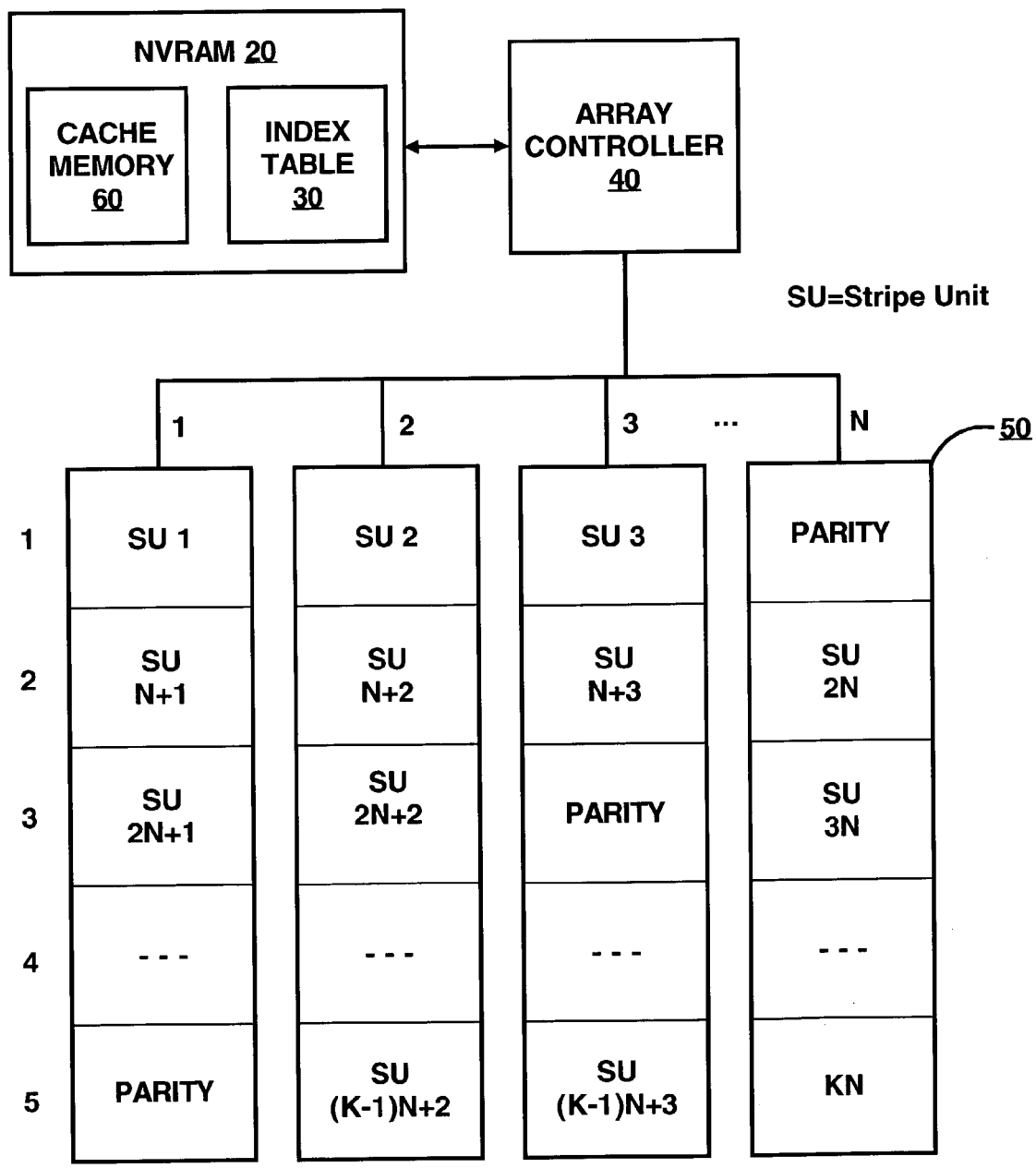
FIG. 2 illustrates another embodiment of the computer system as shown in FIG. 1.

FIG. 2 illustrates another embodiment of the system 10, with an expanded view of the storage device 50. The magnetic disk 50 array is a logical unit. The storage device 50, as shown, contains a plurality of stripe units (SU) or data blocks. Each data block is separate memory device, or data stripe. Each data block is typically 64 Kb in length. The storage device 50, as illustrated, is a RAID Level-5 array. The array consists of K rows of data blocks, with each row having N data blocks. One remaining block in each row 1-K may contain a parity field (PARITY). The parity field provides the redundancy for each row the array. The logical order of the data blocks is from left to right within each row starting with row 1 and proceeding through row K.

The embodiment shown in FIG. 2 is provided for illustration purposes and not by way of limitation. It will be apparent to one of ordinary skill in the art that the configuration of the magnetic storage device can vary and be optimized for different applications.

Figure 3A:
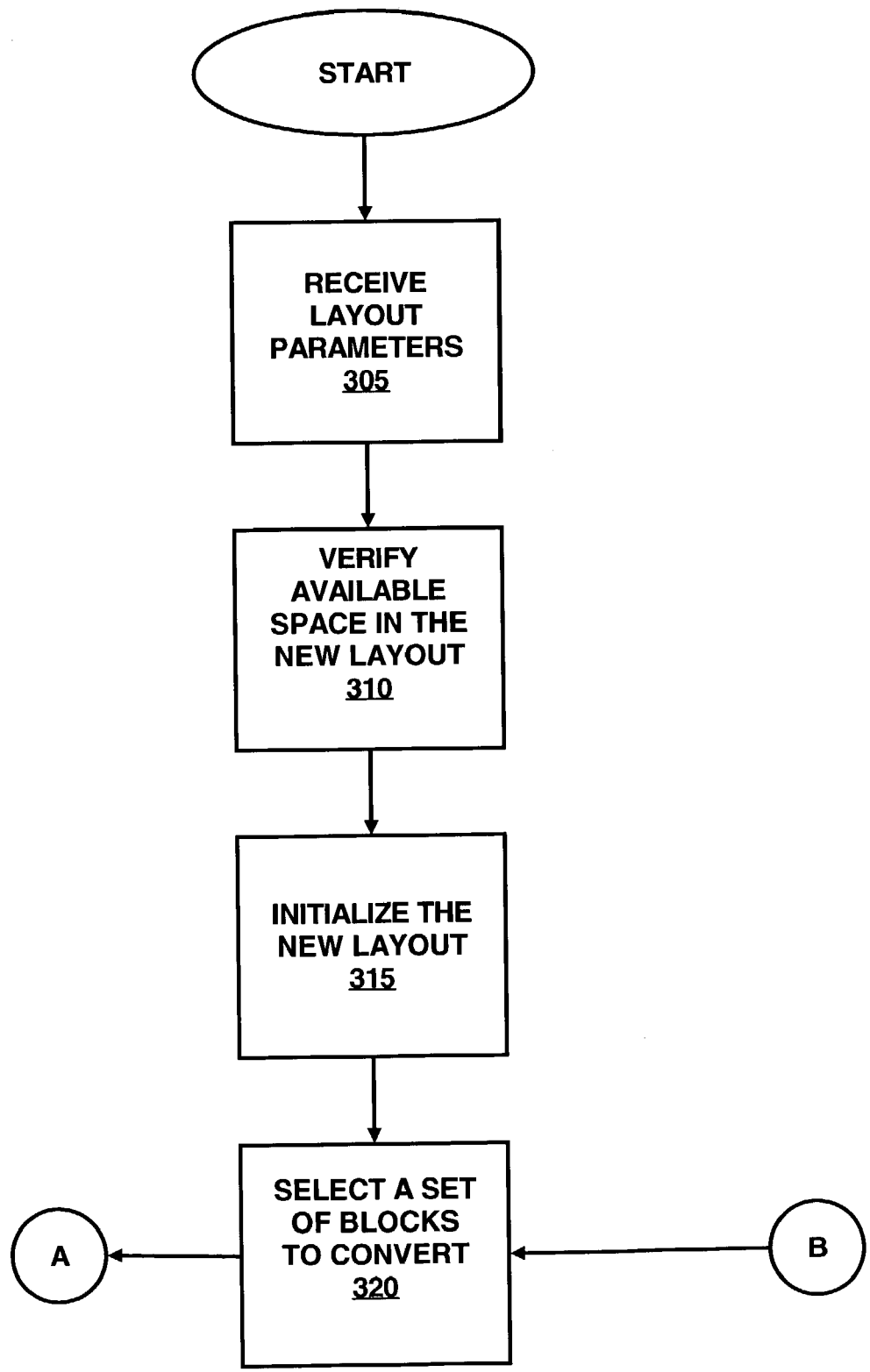
FIGS. 3A and 3B illustrate a flow diagram of an exemplary method, according to an embodiment of the invention.
Figure 3B:
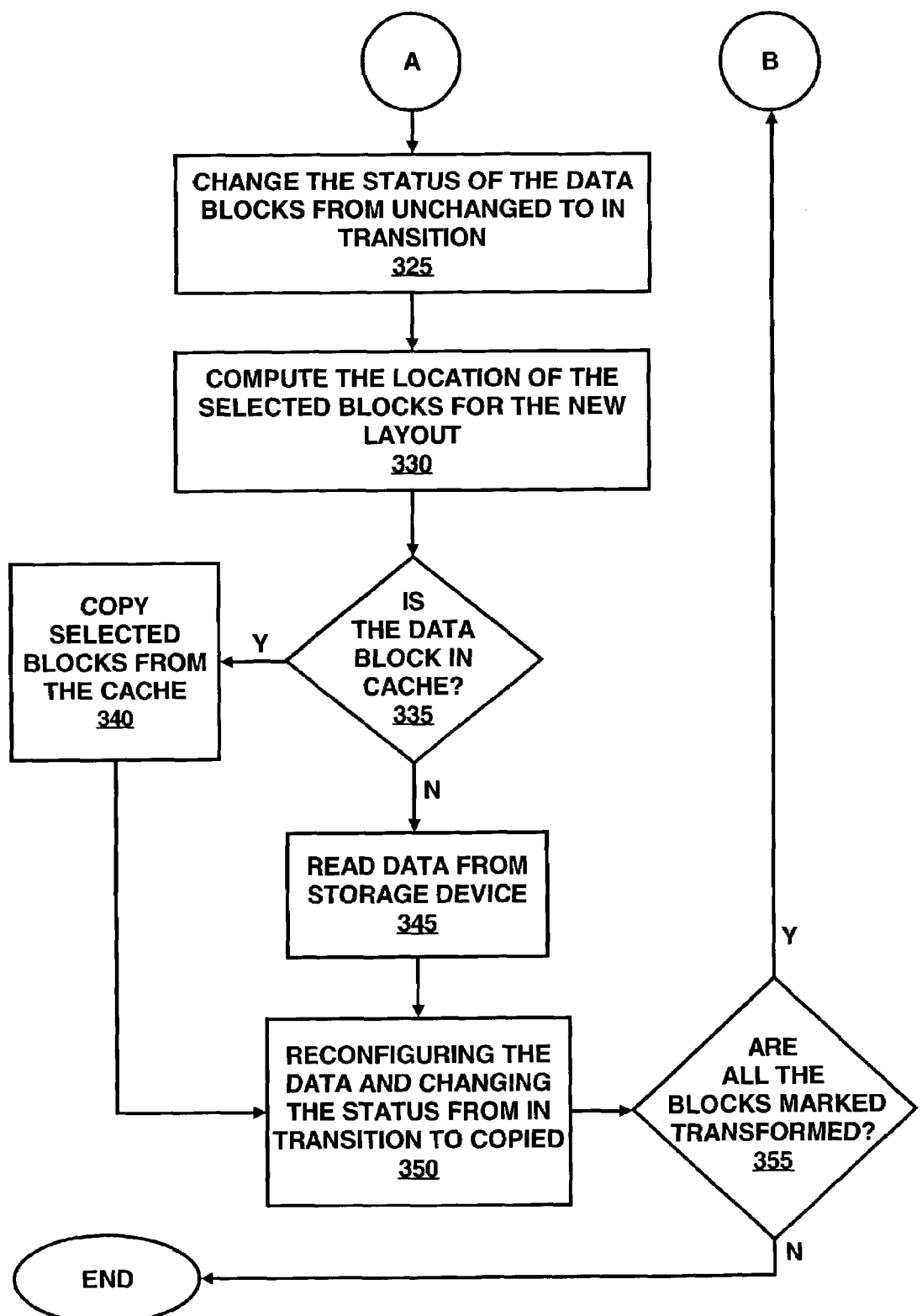

FIGS. 3A and 3B illustrate a flow diagram of method 300, according to an embodiment of the invention. The method 300 is described with respect to the computer system 10, shown in FIGS. 1 and 2, but may be applied to other systems. In step 305, the array controller 40 receives the layout parameters. This request may be generated from the array controller 40 or a client 80 connected to the storage device 50 via the network 70. The layout parameters may indicate to enlarge or reduce the existing layout or to create a new layout on the storage device 50, such as with data from an existing layout.

In step 310, the array controller 40 verifies that the storage device 50 includes the necessary amount of space to implement the new array layout. The array controller 40 may employ well-known space recognition algorithms to determine the amount of available space. This technique is well known in the art. If there is not enough space to implement the new layout, then the process ends.

In step 315, the array controller 40 initializes the new layout of the storage device 50. The request to change the layout may indicate the desired new layout. For example, the request may indicate that the storage device 50 should change from RAID level 4 to RAID level 5, or from RAID level 5 to RAID level 0. The array controller 40 recognizes a request to change the layout and initializes the index table 30 and cache 60 of the NVRAM.

In step 320, once the space has been verified, a set of data blocks is selected to convert to the new layout. One of ordinary skill in the art can recognize that a number of data blocks that may be selected by the array controller 40 is arbitrary, and may vary by application. The addresses of the selected data blocks are stored in the index table 30.

In step 325, the status of the selected data blocks is changed from unchanged to in transition. The memory addresses of the selected data blocks are stored in the index table 30. The memory addresses represent the data blocks that existing in the old layout, those that are presently part of the reconfiguration process, and those that exist in the new layout. Once the data blocks have been selected, the array controller 40 instructs the index table 30 to change the status of the selected blocks from unchanged (which indicates existing in the old layout) to in transition (which indicates that the data blocks are being reconfigured to the new layout).

In step 330, the array controller 40 computes the locations in the new layout for the selected data blocks. Computing locations in the new layout is well known in the art and to one of ordinary skill in the art.

In step 335, the array controller 40 determines whether the selected data blocks are stored in the cache 60.

If the selected data blocks are stored in the cache 60, then the data blocks are read from the cache 60, as shown in step 340. The array controller 40 reads the data blocks from the cache 60 in the old layout and reconfigures the data blocks into the new layout, including any redundant or parity data corresponding to the data blocks in the new layout. Upon reconfiguring the data blocks into the new layout, the index table 30, changes the status of the data blocks from in transition to copied, as shown in step 345.

If the selected data blocks are not stored in the cache 60, then the array controller 40 reads the data from the storage device 50, as shown in step 345, and reconfigures the data blocks from the old layout. The index table 30 changes the status of the data blocks from in transition to copied, as shown in step 350.

In step 355, the array controller 40 determines whether all the data blocks in the original layout have been reconfigured. If all the data blocks have been determined to be reconfigured, then all the data blocks have been reconfigured from the original layout to the new layout and the process ends. However, as shown in the Figure, if there are other data blocks to be reconfigured into the new layout, then the method 300 returns to step 320, and selects another data block to be reconfigured to the new layout.

Figure 4:
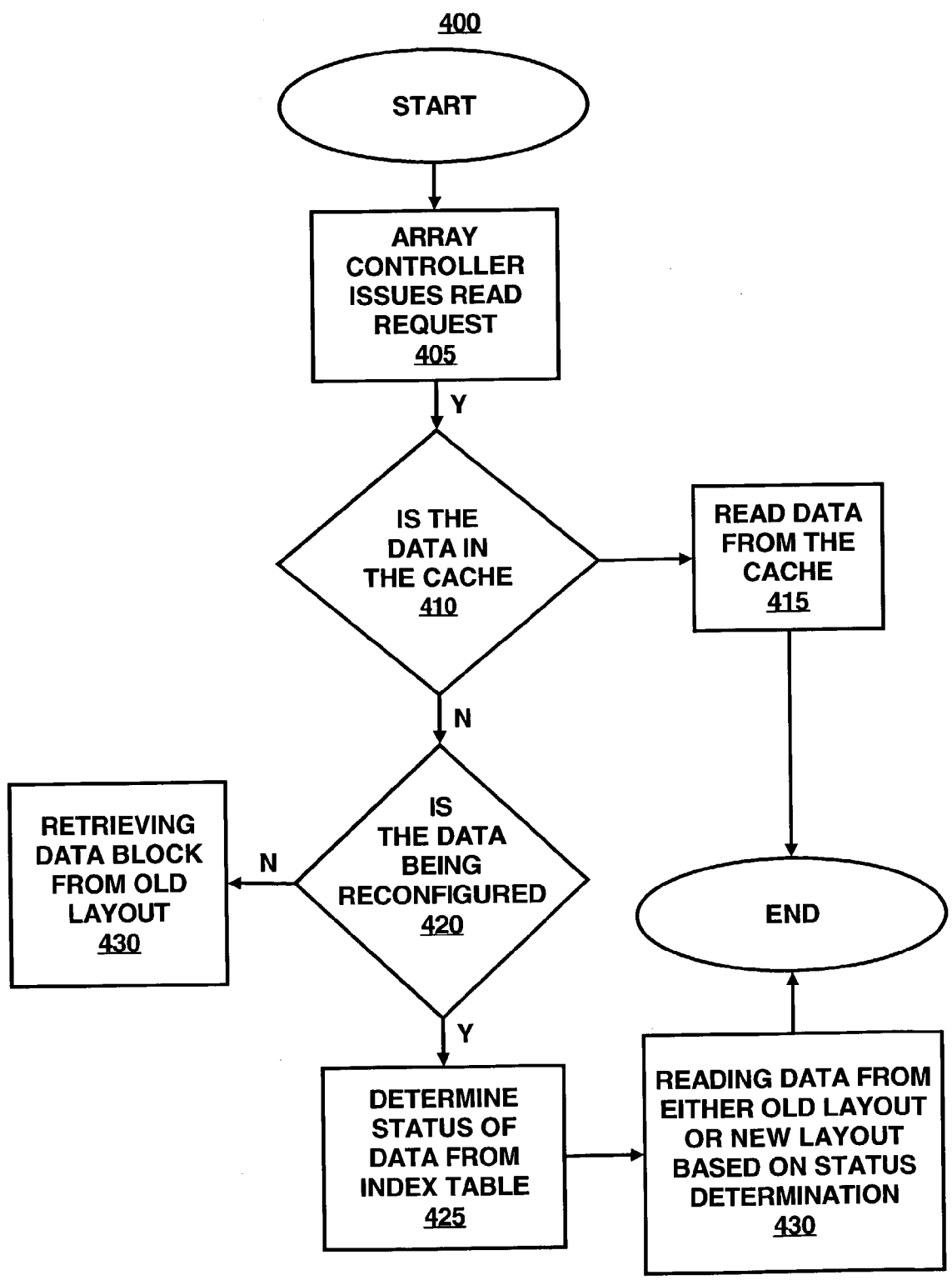
FIG. 4 illustrates another flow diagram of an exemplary method, according to an embodiment of the invention.

FIG. 4 illustrates a flow diagram of method 400, according to an embodiment of the invention. Specifically, FIG. 4 illustrates a method of reading data from the storage device 50, while the layout is changed.

In step 405, the array controller 40 may receive a request to read data from the storage device 50. The read request may be generated by the array controller 40 or received from a client 80 transmitted via the network 70.

In step 410, the array controller 40 determines whether the requested data is the cache 60. If the data is found to be in the cache 60, the data is read from the cache 60 to the requesting client 80 via the array controller 40, as shown in step 415.

If the data is not cache memory 60, then the array controller determines whether the requested data is being reconfigured as shown in step 420. If the data is not being reconfigured, then as shown in step 440, the data is retrieved from the old layout and communicated to the requesting agent.

If the array controller 40 determines that the data is being configured, then the array processor 40 accesses the index table 30 to determine the status of the desired data block, as shown in step 425. The index table 30 may indicate whether the desired data block to which data is be read is in at least one of the following conditions: whether the data block is unchanged, in transition or changed.

In step 430, the data is read from either the old layout or the new layout based on the status of the index table 30. If the index table 30 indicates that the status of the desired data block is unchanged or in transition, then the data is read from the old layout. However, if the status is changed, then the array controller 40 accesses the new layout for the requested data.

Figure 5:
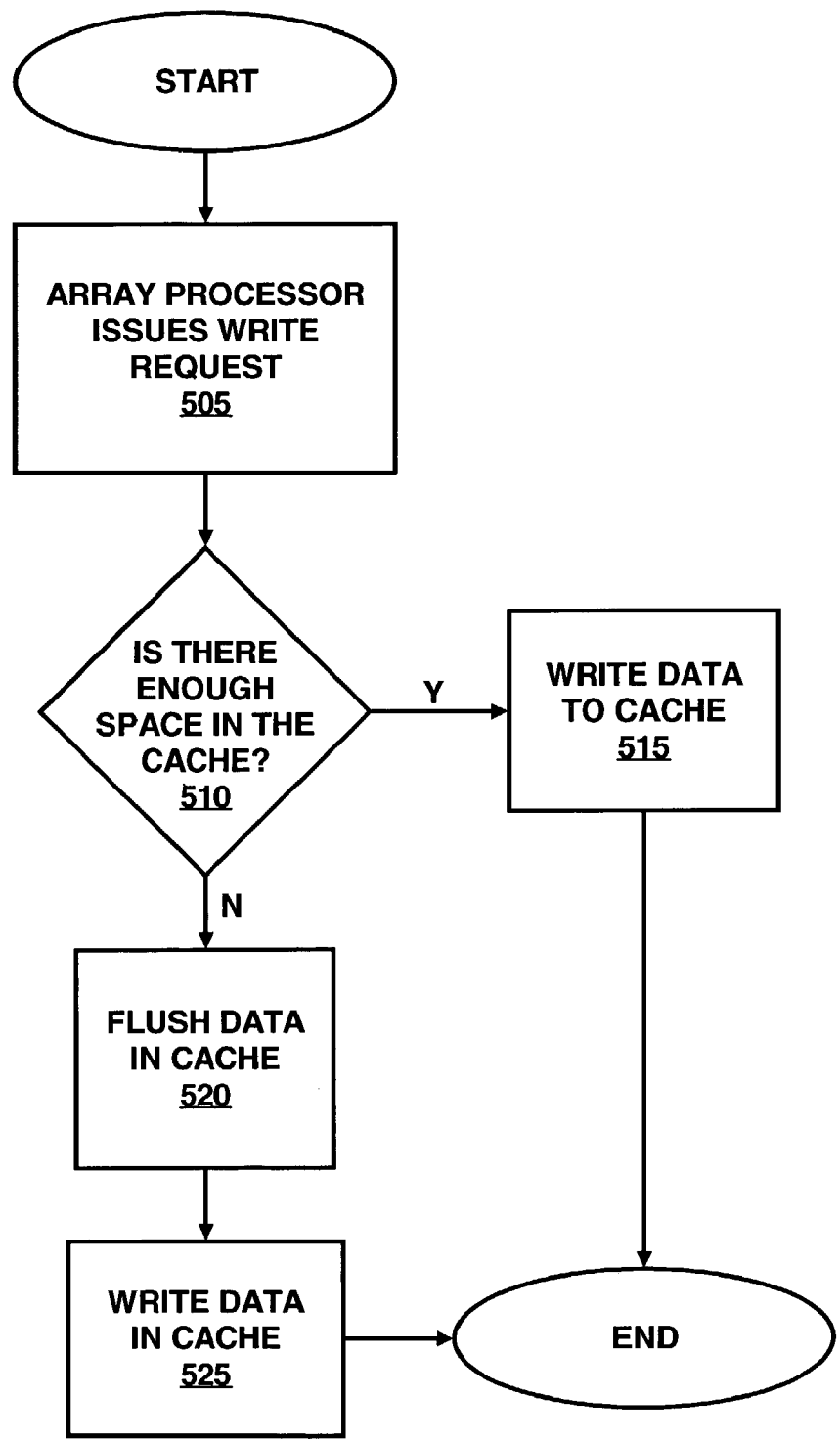
FIG. 5 illustrates yet another flow diagram of an exemplary method, according to an embodiment of the invention.

FIG. 5 illustrates a flow diagram of method 500, according to an embodiment of the invention. Specifically, FIG. 5 illustrates a method of writing data to the storage device 50, while the layout of the storage device is being changed.

In step 505, the array controller 40 receives a request to write data to the storage device. The request could be generated by the array controller 40 or received from a client 80 transmitted via the network 70.

In step 510, the array processor 40 determines whether there is enough space in the cache 60 to store the data that is to be written to the storage device 50. If the array controller 40 determines that there is sufficient space in the cache 60, as shown in step 515, the data is written to the cache memory.

In step 520, if the array processor 40 indicates that there is not sufficient space in the cache 60, the array controller 40 may flush data in order to create space on the cache 60, as shown in step 520. This feature will be explained with more detail with regards to FIG. 6.

If the index table 30 indicates that the desired data block has not been reconfigured into the new layout, then the array processor 40 retrieves the location of the request data blocks in a known manner. The array processor may than write the data to the storage device 50 in a known manner, as shown in step 520.

In step 525, after data has been flushed from the cache 60, writing data into the cache 60.

Figure 6:
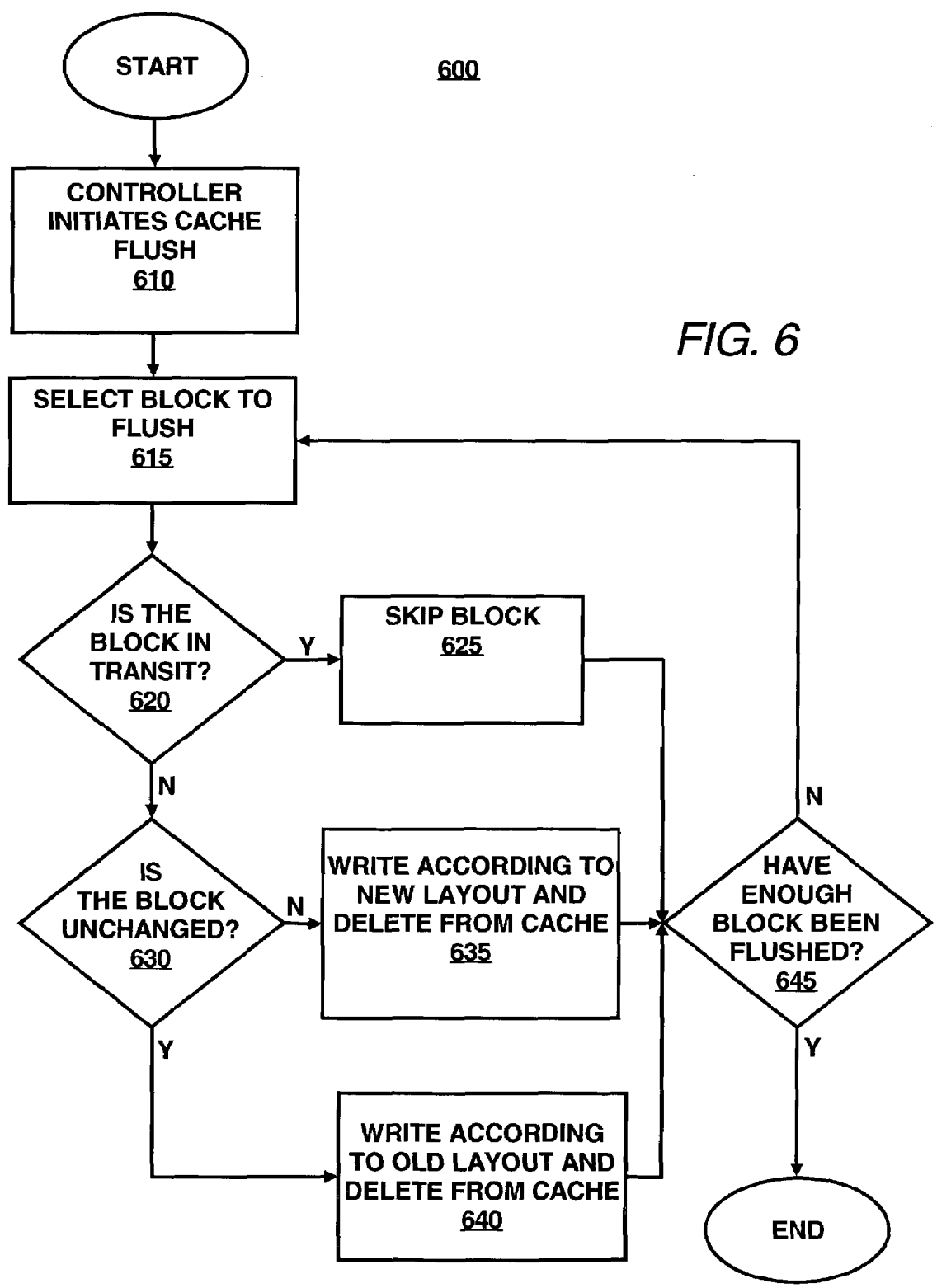
FIG. 6 illustrates yet another flow diagram of an exemplary method, according to an embodiment of the invention.

FIG. 6 illustrates a flow diagram of method 600, according to an embodiment of the invention. Specifically, FIG. 6 illustrates a method of cache flushing (or destaging).

In step 610, the array controller 40 initiates a cache flush. As described above, with regards to FIG. 5, when the array processor 40 indicates that there is not sufficient space in the cache 60, the array controller 40 may flush data in order to create space on the cache 60, as shown in step 520.

In step 615, the array controller 40 selects a data block from the cache to flush that has not previously been selected in this round of cache flushing. The selection may be accomplished using a known method, such as LRU (Least Recently Used).

Once the data block is selected, then the array controller 40 determines from the index table 30 whether the selected block is in transition, as shown in step 620. Also, the controller 40 determines whether the selected block is unchanged or changed.

If the index table 30 determines that the selected data block is unchanged, as shown in step 630, then, as shown in step 640, write the new data according to the old format. Also write any redundant or parity data corresponding to the selected data block according to the old format and delete the data from cache.

As shown in step 625, if the index table 30 indicates that the selected block is in transition, then skip the selected block for this round of cache flushing.

As shown in step 635, if the index table 30 indicates that the selected block has been changed, then write data according to the new format. Also write any redundant or parity data corresponding to the selected data block according to the new format and delete the data from cache.

In step 640, the array controller 40 determines whether enough blocks been flushed. If yes, end. If not, then return to step 615.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims—and their equivalents—in which all terms are meant in their broadest reasonable sense unless otherwise indicated.

What is claimed is:

1. An adjustable storage system for modifying a layout of a storage device having a plurality of data blocks, during a transfer process, comprising:

an array controller connected to the storage device;

an index table connected to the array controller for storing addresses representing data blocks in the storage deviceand stauses of the data blocks, such that the addresses of the stored data blocks represent the data blocks involved in the transfer process; and wherein the statuses include;

a first status provided to any of the data blocks that has not been transferred in the transfer process;

a second status provided to any of the data blocks that is presently being transferred in the transfer process; and a third status provided to any of the data blocks that has already been transferred in the transfer process.

2. The system of claim 1, wherein the index table stores the addresses of the data blocks that have already been transferred and the address of the data blocks that are presently being transferred.

3. The system of claim 1, wherein the transfer process includes at least one of, expanding the layout of the storage device, reducing the layout of the storage device, and converting between array layouts.

4. The system of claim 1, wherein the array controller is operable to control access to the storage device, such that in response to a read or write request, the array controller is operable to retrieve a location of a requested data block from the index table and access the requested data block.

5. The system of claim 4, wherein the array controller is provided with a capability to limit access the the storage device, in response to determining from information in the index table that the desired data blocks are being transferred.

6. The system of claim 1, wherein to storage device is a RAID array and the layout is one of the pluralities of RAID array formats.

7. The system of claim 1, wherein the plurality of data blocks in the storage device are data stripes.

8. The system of claim 1, further comprising:
a cache memory connected to an array controller;
wherein the array controller generates a request to read data from the storage device, such that the array controller determines whether the requested data is stored in the cache memory, and whether the data is being reconfigured, and based on whether the data is being reconfigured reading data from the storage device from a particular layout.

9. The system of claim 1, wherein the array controller generates a request to write data to the storage device, such that the array controller determines whether there is sufficient capacity in the cache memory and based on that determination either flushes the cache memory to create sufficient space or writes data to the cache memory.

10. A method for reconfiguring a portion of a storage device, the method comprising the steps of:
selecting a plurality of data blocks in the storage device;
changing a status of a data block stored in an index table from a first status indicating the data block has not been changed to a new layout to a second status indicating the data block is being changed to the new layout, which stores addresses of the plurality of selected data blocks;
granting access to the plurality of selected data blocks based on information in the storage device;
reconfiguring the plurality of selected data blocks to a desired layout;
receiving a request to initialize a portion of the storage device;
determining whether there is sufficient space to reconfigure the storage device; and
sequentially repeating the above steps of selecting, changing, and reconfiguring until all the selected data blocks in the storage device have been transferred to the new format.

11. The method of claim 10, wherein the information stored in the storage device comprises: the addresses of the selected data blocks which are being reconfigured, and the addresses of the selected data blocks which have already been reconfigured.

12. The method of claim 10, further comprising the steps of:
generating a request to read data from the storage device;
determining whether the requested data is stored in a cache;
determining whether the requested data is being reconfigured from an index table; and
reading the requested data from the storage device in a predetermined format based an output of the index table.

13. The method of claim 10, further comprising the steps of:
generating a request to write data to a storage device;
determining whether there is sufficient space in a cache;
flushing data from the cache if there is not sufficient space; and
writing data to the cache.

14. The method according to 13, wherein the step of flushing data further comprises:
selecting a data block to flush;
determining the status of the selected data block;
writing data to the storage device based on status of the selected data block;
determining whether a sufficient amount of data blocks have been flushed.

15. The method of claim 10, wherein the step of reconfiguring includes at least: expanding the layout, contracting the layout, and converting between RAID formats.

16. The method of claim 10, wherein the storage device is a redundant array of independent disks (RAID).

17. A method for reconfiguring an existing layout of a storage device, the method comprising the steps of:
selecting a plurality of data blocks in the storage device;
storing addresses of the plurality of selected data blocks in a storage device, such that the stored memory addresses of the plurality of data blocks include a first status provided to the data blocks that are in the process of being reconfigured and not yet transferred; a second status provided to the data blocks that have already been transferred; and a third status provided to the data blocks that have already been transferred, wherein the statuses and addresses of the plurality of selected data blocks are stored in an index table;
determining whether the selected plurality of data blocks is in a cache;
determining whether the selected plurality of data blocks is being reconfigured;
reading the selected plurality of data blocks from the storage device based on the stored addresses; and
storing the selected plurality of data blocks according to the new layout.

18. The method of claim 17, further comprising the step of:
sequentially repeating the above steps of selecting, and storing until all predetermined data blocks in the storage device have been transferred to the new layout.

19. The method of claim 17, further comprising the steps of:
generating a request to read data from the storage device;
determining whether the requested data is stored in a cache;
determining whether the requested data is being reconfigured from the index table; and
reading the requested data from the storage device in a predetermined format based on output of the index table.

20. The method of claim 17, wherein the storage device is a redundant array of independent disks (RAID).

21. The method of claim 17, wherein the step of reconfiguring is at least, expanding the layout, contracting the layout and converting between RAID formats.

22. The method of claim 17, further comprising the steps of:
generating a request to write data to a storage device;
determining whether there is sufficient space in a cache;
flushing data from the cache if there is not sufficient space; and
writing data to the cache.

23. The method according to 22, wherein the step of flushing data further comprises:
selecting a data block to flush;
determining the status of the selected data block;
writing data to cache based on status of the selected data block;
determining whether a sufficient amount of data blocks have been flushed.

24. Apparatus for transforming the layout of a storage device, without reducing access to the storage device, the apparatus comprising:
means for selecting a plurality of data blocks in the storage device;
means for changing a status of a data block stored in an index table from a first status indicating the data block has not been changed to a new layout to a second status indicating the data block is being changed to the new layout, which stores the addresses of the plurality of selected data blocks;
means for granting access to the plurality of selected data blocks based on information in the storage device;
means for reconfiguring the plurality of selected data blocks to a desired layout;
means for receiving a request to initialize a portion of the storage device;
means for determining whether there is sufficient space to reconfigure the storage device; and
means for sequentially repeating the above steps of selecting, changing, and reconfiguring until all the plurality of selected data blocks in the storage device have been transferred to the new format.

25. The apparatus of claim 24, further comprising:
means for selecting another plurality of data blocks for transfer to a transformed layout of the storage device.

26. The apparatus of claim 24, further comprising:
means for sequentially repeating the above steps of selecting, storing, and selecting until all the data blocks in the storage device have been transferred to the transformed layout.

27. The apparatus of claim 24, wherein the storage device is a redundant array of independent disks (RAID).

28. The apparatus of claim 24, wherein the means for reconfiguring comprises means for at least, expanding the layout, reducing the layout and converting between RAID.

29. The apparatus of claim 24, wherein requests to read and write to the storage device are capable of being stored on a cache memory;
such that the array controller generates a request to read data from the storage device, such that the array controller determines whether the requested data is stored in the cache memory, and whether the data is being reconfigured, and based on whether the data is being reconfigured reading data from the storage device from a particular layout; and
wherein the array controller generates a request to write data to the storage device, such that the array controller determines whether there is enough space in the cache memory and based on that determination, either flushes the cache to create sufficient space or writes data to the cache.

* * * * *

UNITED STATES PATENT AND TRADEMARK OFFICE
CERTIFICATE OF CORRECTION

PATENT NO. : 7,032,086 B2  Page 1 of 1
APPLICATION NO. : 10/375177
DATED : April 18, 2006
INVENTOR(S) : Arif Merchant It is certified that error appears in the above-identified patent and that said Letters Patent is hereby corrected as shown below:

In column 6, line 59, in Claim 1, delete "deviceand stauses" and insert -- device and statuses --, therefor.

In column 6, line 62, in Claim 1, delete "include;" and insert -- include: --, therefor.

In column 7, line 17, in Claim 5, after "access" delete "the" and insert -- to --, therefor.

In column 7, line 21, in Claim 6, delete "to" and insert -- the --, therefor.

In column 8, line 9, in Claim 12, delete "an" and insert -- on --, therefor.

In column 9, line 13, in Claim 23, after "to" insert -- claim --.

Signed and Sealed this

Sixth Day of April, 2010

David J. Kappos
*Director of the United States Patent and Trademark Office*